Sept. 22, 1964   M. J. MACK   3,149,498

HIGH-LOW-REVERSE TRANSMISSION

Filed June 15, 1961   3 Sheets-Sheet 1

INVENTOR.
M. J. MACK

Sept. 22, 1964   M. J. MACK   3,149,498
HIGH-LOW-REVERSE TRANSMISSION
Filed June 15, 1961   3 Sheets-Sheet 2
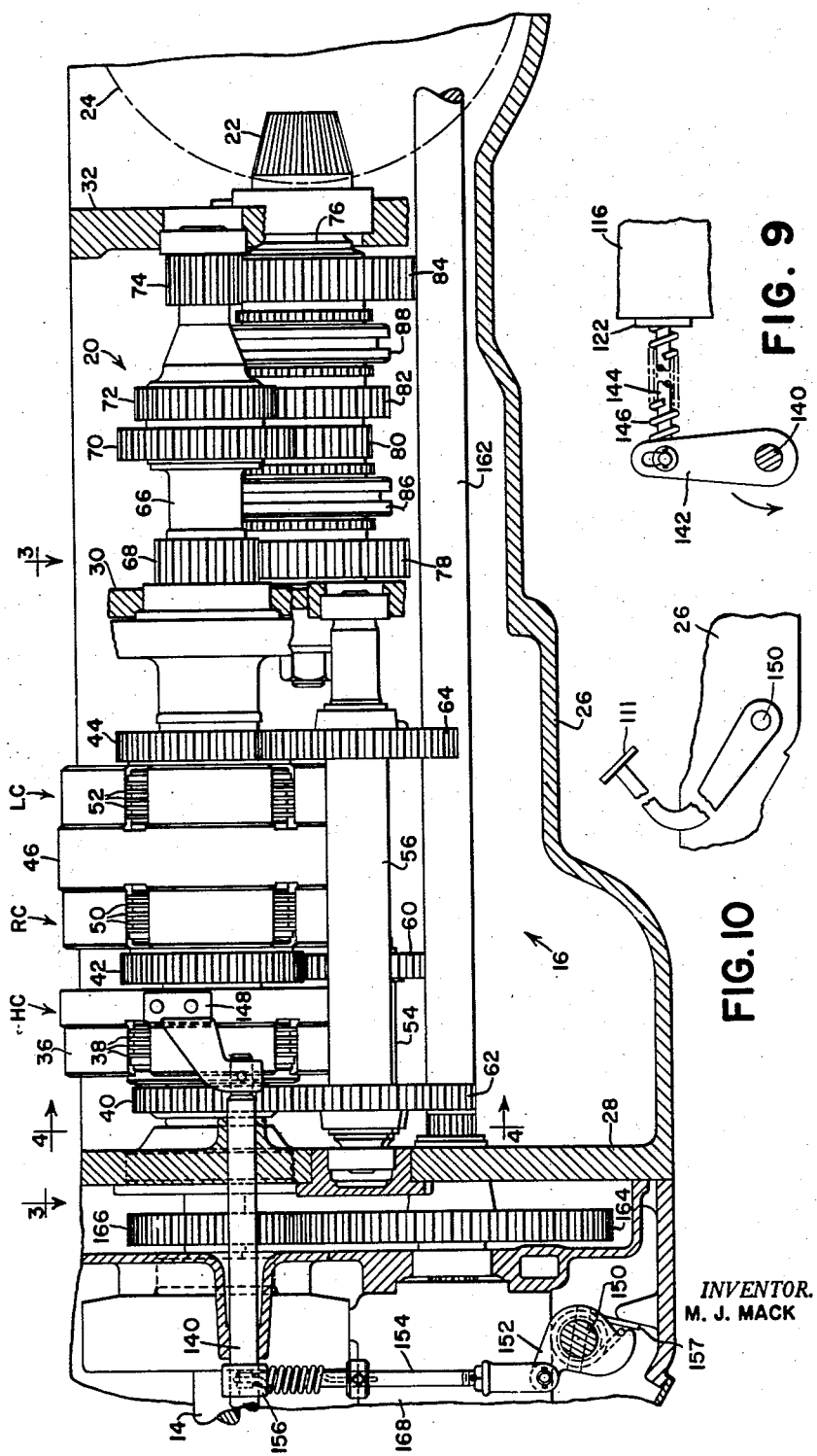
INVENTOR.
M. J. MACK

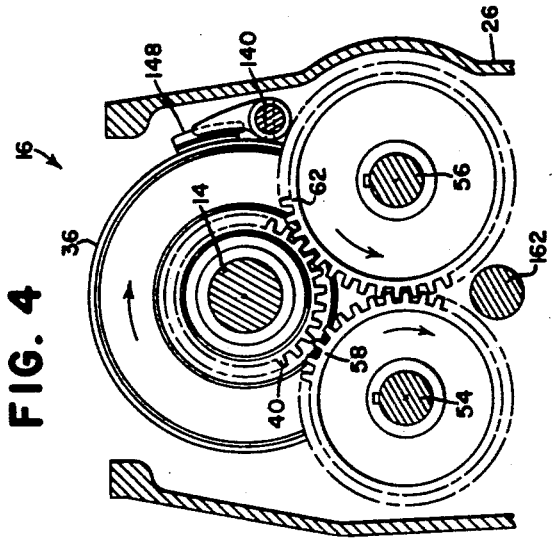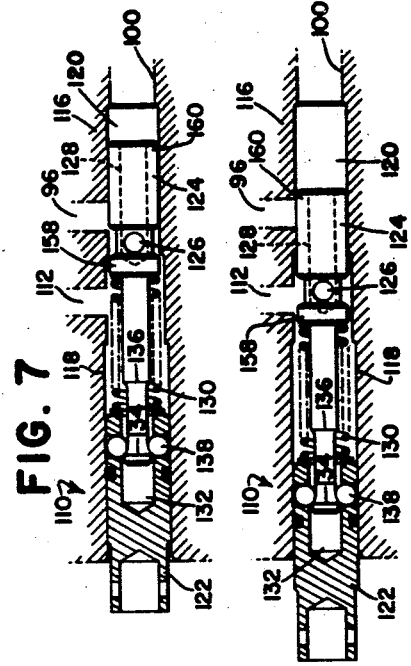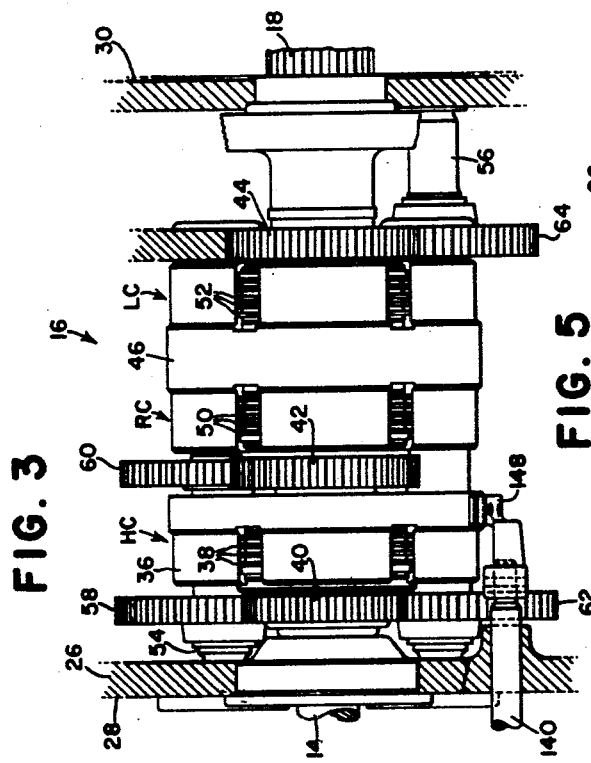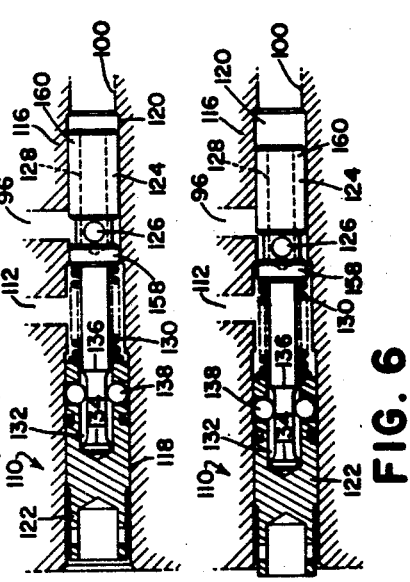
INVENTOR.
M. J. MACK

United States Patent Office 3,149,498
Patented Sept. 22, 1964

3,149,498
HIGH-LOW-REVERSE TRANSMISSION
Michael J. Mack, Waterloo, Iowa, assignor to Deere & Company, Moline, Ill., a corporation of Delaware
Filed June 15, 1961, Ser. No. 125,327
14 Claims. (Cl. 74—364)

This invention relates to a transmission and more particularly to a multi-range transmission having special although not limited adaptability to agricultural and industrial tractors for the purpose of providing a plurality of forward and reverse speeds by means of a range section ahead of a speed section so that the number of speeds in the latter can be doubled in the forward direction and used in plurality in reverse.

Transmissions of the range-speed type are of course well known and most of these relay upon a relationship in the range section of a plurality of clutches selectively operative to produce two forward speed ratios and one reverse speed ratio for the input shaft of the speed section, the latter normally consisting of a power train of the sliding-gear type producing, in most instances, three, four or five speed ratios. Improvements in the basic power train are deemed to be necessary in the overall arrangement, control and adaptation of speed ratios to particular vehicular instances. Other problems arise in connection with the shifting in the range section as between high and low and as between forward and reverse, because the torque-transmitting characteristics are different and rates of clutch engagement and disengagement, as well as sequencing thereof, must be properly handled. Other problems arise in connection with the provision, in conjunction with the power train, of power take-off shafting for driving auxiliary implements and machinery.

According to the present invention, the principal object is to provide all of the foregoing improvements in a novel and compact power train in which a plurality of shafts are arranged in such manner that the gearing thereof can be in constant mesh through the intermediary of a plurality of clutches, thus enabling the use of relatively inexpensive spur gearing as compared with higher-cost planetary gearing. Another object is to arrange the power train components in such manner that they may be readily embodied in a comparatively small transmission housing, having also in mind the provision for nesting a power take-off shaft in the main power train components, thereby overcoming space complications. A still further object resides in improved control means in which the clutch control is modulated for all three clutches, and in conjunction therewith a transmission brake is provided for retarding the speed of the driven or output member.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 2 is a longitudinal section of the transmission of FIG. 1, showing the physical embodiment thereof in a typical commercial expression of the structure.

FIG. 3 is a partial plan view, partly in section, as seen along the line 3—3 of FIG. 2.

FIG. 4 is a transverse section as seen along the line 4—4 of FIG. 2.

FIGS. 5, 6, 7 and 8 are enlarged sectional views showing various positions of the clutch control valve.

FIG. 9 is a fragmentary view showing a typical connection of the clutch-operating rockshaft to the clutch control valve.

Figure 1:
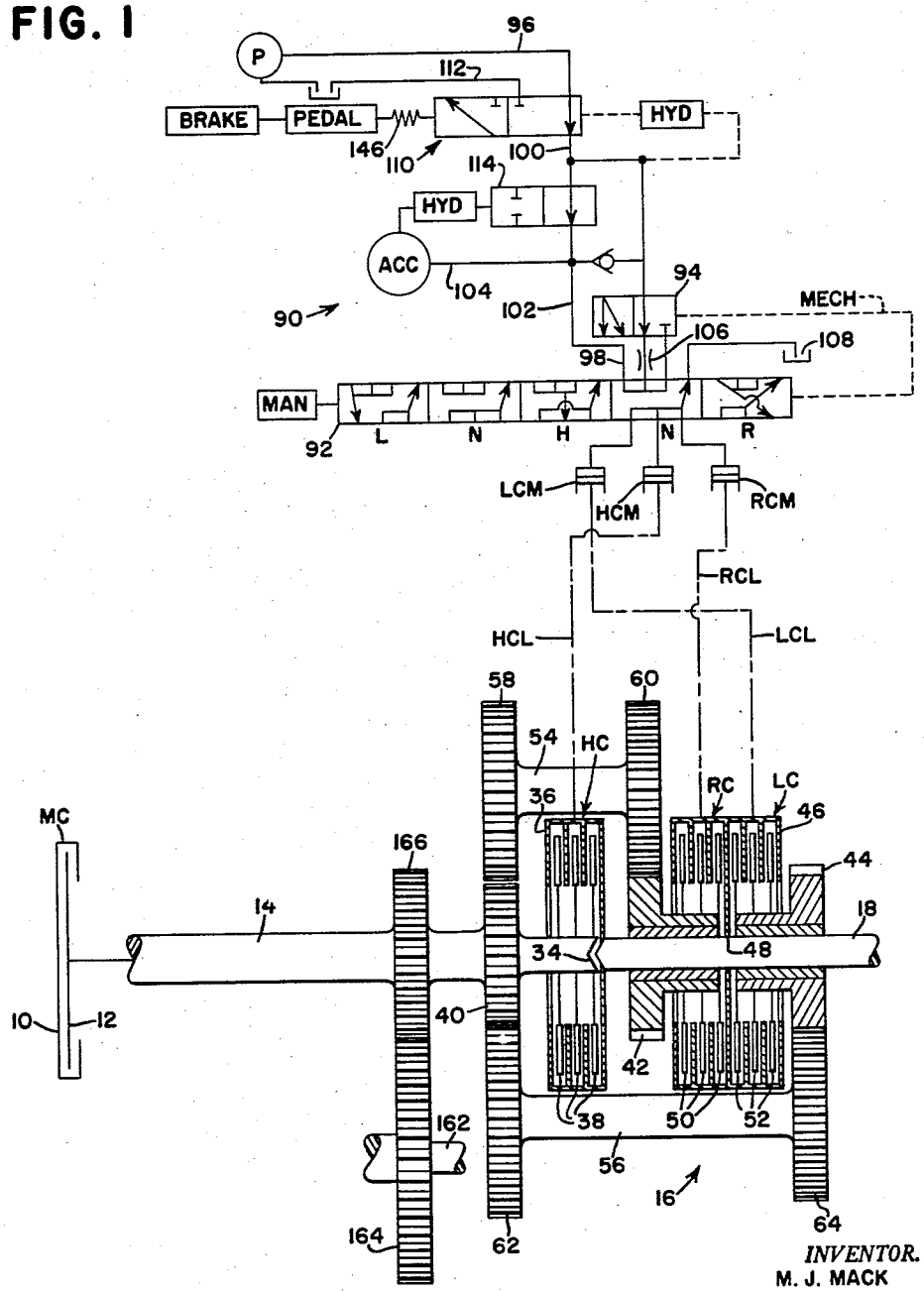
FIG. 1 is a schematic view, partly in section, showing the overall arrangement and the control therefor.

FIG. 10 as a small-scale fragmentary view showing the clutch pedal and its mounting.

Since the present transmission has been adapted particularly for agricultural and industrial tractors, and similar vehicles, and since such vehicles normally employ transmissions in which the main shafts extend fore and aft, the invention will be defined in terms of such location and arrangement. However, it will be understood that the components could be otherwise arranged, since it is not unknown to provide a power train in which the main shafting runs transverse to the longitudinal or fore-and-aft center line of the vehicle. Therefore, such expressions as "front," "rear" etc. are used as terms of convenience and not of limitation.

The basic source of power for the power train may be a typical internal combustion engine, which is not shown, since it is conventional. However, in FIG. 1 the letters MC designate what might be regarded as a conventional engine clutch or master clutch, having a driving or input side or part 10 powered by such engine and a driven part in the form of a clutch plate 12 which is connected in typical fashion to an input shaft 14 which, in the present environment, extends fore and aft as respects the longitudinal center line of the vehicle.

The shaft 14 is the input for that part of the transmission which is known as the range section, here designated in its entirety by the numeral 16, and this range section has an output shaft 18, coaxially rearwardly of the input shaft 14, which serves as the input for that portion of the power train referred to as the speed section, here designated in its entirety by the numeral 20. The output of the speed section is connected in any suitable manner to the final drive of the vehicle, the output in the present case being represented by a bevel pinion 22 which meshes with a ring gear 24. These details, as well as the housing and support of the power train, can be varied without sacrificing any of the principles of the present invention. A typical transmission housing is shown at 26 as having a front wall 28, an intermediate wall 30 and a rear wall 32. The proximate ends of the coaxial input and output shafts 14 and 18 may be appropriately interjournaled, as suggested schematically at 34 in FIG. 1. Here again, this is a detail that could take any form.

A front or "high" clutch HC is provided for selectively connecting and disconnecting the input and output shafts. In the present case, the clutch HC includes a driven part in the form of a drum 36 keyed or otherwise appropriately fixed to the output shaft 18 to rotate therewith, plus a driving part made up of a plurality of clutch plates 38 keyed to the rear end of the input shaft 14. The clutch HC is of the hydraulic-apply type, many examples of which are known to those versed in the art, and consequently the details are not shown. However, for purposes of general environment, the clutch HC is shown as being under the control of a clutch motor HCM, illustrated as being hydraulically connected to the clutch HC by a fluid pressure line HCL.

An input shaft gear 40 is coaxially keyed to a rear portion of the input shaft 14 just ahead of the clutch HC, and first and second coaxial intermediate gears 42 and 44 are journaled on the output shaft 18 rearwardly of the clutch HC. These gears are associated with two additional clutches, one being a reverse clutch RC and the other a "low" clutch LC, also of the hydraulic type and shown in FIG. 1 as being under the influence of hydraulic motors RCM and LCM respectively, connected to the clutches by fluid pressure lines RCL and LCL respectively.

The two clutches RC and LC preferably have a common drum 46 which represents the driven part for both clutches, the drum being coaxially keyed or otherwise secured to the output shaft 18 as at 48 (FIG. 1). The driving part for the clutch RC is represented by a plurality of clutch plates 50 keyed or otherwise coaxially secured to the hub of the first intermediate gear 42, which will be hereinafter referred to as the reverse intermediate gear. The driving part for the clutch LC is represented by a plurality of clutch plates 52 coaxially keyed or otherwise fixed to the hub of the second intermediate gear 44, hereinafter referred to as the low intermediate gear.

From the description thus far, it will be seen that engagement of the clutch HC will establish drive between the input and output shafts 14 and 18, with the latter of course turning in the same direction and at the same speed as the former. To obtain a second forward range speed and a reverse range speed in the range section 16, the two clutches RC and LC are associated respectively with reverse and low-speed countershafts 54 and 56, the former having front and rear gears 58 and 60 thereon and the latter having front and rear gears 62 and 64 thereon. In the case of each countershaft, the respective gears are coaxially fixed thereto to rotate therewith. FIG. 2 shows typical journaling of the countershaft 56 in the transmission housing 26 but, as already stated, these details are relatively insignificant, except insofar as the three sets of shafts 14-18, 54 and 56 are arranged, which is best shown in FIG. 4, wherein it is clear that the axis of rotation of the shaft 14 is at the apex of a triangle of which a substantially horizontal line drawn between the axes of the shafts 54 and 56 forms the base. The low-speed countershaft front gear 62 is in constant mesh with the input gear 40 and the low-speed countershaft rear gear is in constant mesh with the low speed intermediate gear 44. The front gear 58 on the reverse countershaft 54 is in constant mesh with the front gear 62 on the low-speed countershaft 56; and the rear reverse countershaft gear 60 is in constant mesh with the reverse intermediate gear 42. It is important to note that the gear 58 is not in direct mesh with the input shaft gear 40 (FIGS. 1 and 4). Now, with all clutches disengaged, it will be seen that the input shaft gear 40 drives both countershafts, and, assuming that the direction of rotation of the input shaft 14 as seen in FIG. 4 is clockwise, as represented by the arrow, the direction of rotation of the countershaft 56 will be counterclockwise, also shown by an arrow. Since the gear 58 on the reverse countershaft 54 meshes with the gear 62 and not with the input shaft gear 40, the direction of the rotation of the countershaft 54 will be clockwise, as represented by the arrow. Since the gear 64 is in constant mesh with the gear 44, the latter, as well as the clutch plates 52 of the clutch LC, will be driven in a clockwise direction as seen in FIG. 4—the same direction as that of the input shaft 14. However, the reverse gear 42 will be driven in the opposite direction, because of the mesh of gears 58 and 62 and 60 and 42, the clutch plates 50 of the reverse clutch RC likewise rotating in a counterclockwise direction.

As already stated and as will be obvious, engagement of the clutch HC will drive the output shaft 18 in the same direction and at the same speed as the input shaft 14. The countershaft reduction in low speed (gears 42-62 and 64-44) will drive the output shaft 18 in the same direction as the input shaft 14 but at a lower speed when the low clutch LC is engaged. A reduction in speed ratio as well as a reversal of direction will result when the reverse clutch RC is engaged because of the intermediary of the reverse countershaft 54 and the gear mesh at 62-58 and 60-42. Therefore, the output shaft 18 is capable of being driven at two forward speeds and one reverse speed. Since the output shaft 18 of the range section 16 is the input for the speed section 20, a speed section transmission shaft 66, which is a coaxial extension of the shaft 18, will likewise be driven at two forward speeds as well as one reverse speed. A transmission countershaft having a plurality of shiftable gears selectively connectible and disconnectible as respects a like plurality of gears on the transmission shaft 66 will provide a plurality of speeds in the speed section which will be doubled in the forward direction by the range section 16 (alternate engagement and disengagement of the clutches HC and LC) and which will be available when the range section is in reverse by engagement of the reverse clutch RC. In the present instance, the speed section is shown as having its transmission shaft 66 provided with four pinions 68, 70, 72 and 74, and journaled on the transmission countershaft 76 are four gears 78, 80, 82 and 84. The countershaft gears are selectively connectible to the countershaft 76 by front and rear synchronizers 86 and 88, respectively, which may be of any conventional pattern, following typical construction in which the transmission and countershaft gearing is in constant mesh and drive depends upon shifting of either of the synchronizers in one or the other of its two directions. For example, the lowest ratio in the speed section is established when the synchronizer 88 is shifted rearwardly to connect the countershaft gear 84 to the countershaft, thus establishing drive from the transmission shaft 66 to the output bevel pinion 22. The highest of the ratios is established by shifting the synchronizer 86 rearwardly to connect the countershaft gear 80 to the countershaft 76, in which case the output bevel pinion 22 rotates at the ratio between the transmission shaft gear 70 and the countershaft gear 80. The two other ratios in the speed section will be obvious on the basis of the sizes of the gears and further description is deemed to be unnecessary. At any rate, the four basic speed ratios available in the speed section 20 are doubled in the forward direction by the range section 16 and are used in the reverse direction by engagement of the reverse clutch RC, thus making the entire power train one in which twelve speeds are available. Specifically, and on the basis of what is disclosed here, and depending upon alternate engagement of the clutches LC and HC, the gearing 74-84 produces first and second forward speeds, the gearing 68-78 produces third and fourth speeds forward, the gearing 72-82 produces fifth and sixth speeds forward and the gearing 70-80 produces seventh and eighth speeds forward, it being understood that the lower speed in each set results from engagement of the low clutch LC and the higher speed in each set results from engagement of the high clutch HC. Four speeds in reverse on the basis of the same ratios are of course obtained when the reverse clutch RC is engaged. It is obvious of course that the clutches HC, RC and LC are mutually exclusively engageable; that is, when one is in engagement, the other two are disengaged.

Any suitable control, not material here, may be provided for selectively shifting the synchronizers 86 and 88. Because of the relationship among the three clutches HC, RC and LC, a forward-reverse "shuttle" is available without shifting in the speed section 20. This will be accomplished by alternating between engagement and disengagement of the clutches HC and RC; although, the same result could be obtained by alternating between the clutches LC and RC. However, the presently disclosed arrangement is preferable and the description will therefore proceed on that basis, particularly in connection with the following disclosure and description of a control valve system indicated in its entirety by the numeral 90 and shown schematically in FIG. 1 as selectively controlling the clutch motors HCM, LCM and RCM.

The specific details of the control system are not material parts of the present invention, being covered in assignee's copending application Ser. No. 25,148, filed April 27, 1960, now Patent No. 2,998,732. Functionally, however, the control is significant from the standpoint of enabling selective alternation between the three clutches HC, RC and LC, and especially in conjunction with a clutch-modulation characteristic that will be presently described.

The hydraulic or equivalent fluid-pressure circuit is powered in the first instance by a pump P and is supplemented by an accumulator ACC. The basic control valve is illustrated at 92 and has associated therewith a secondary or auxiliary valve 94, the two being mechanically interconnected as suggested by the broken line and the legend "MECH." The details of the structure and operation are explained in the above patent. For the present, the system may be best understood by regarding a high pressure line 96 as leading from the pump to the inlet side of the valve 92 at 98 via extensions 100 and 102 of the pump line. The accumulator is chargeable from the pump line as shown at 104, and additionally the pump line leads to a further and restricted inlet 106 for the control valve 92. For present purposes, the two inlets 98 and 106 may be regarded as one, and on this basis it will be seen that the inlet side of the valve 92 is supplied by the pump and accumulator in parallel. In the schematic representation of the valve 92, its length is divided by five rectangles labeled L, N, H, N and R, standing respectively for Low, Neutral, High, Neutral and Reverse. The valve is shown in its neutral position in FIG. 1 wherein it will be clear that the inlet 98–106 is disconnected from the three clutch motors LCM, HCM and RCM, all of these motors discharging in common to reservoir at 108. When the control valve 92 is shifted one station to the right, the H section thereof will become alined with the inlet 98–106 and it will be seen that this inlet feeds the high clutch motor HCM, the other two returning again to reservoir at 108. Shifting of the valve 92 to the left from the FIG. 1 position brings the reverse station into register with the inlet 98–106 and the reverse motor RCM is pressurized, the other two motors exhausting to reservoir 108. Comparable results will be obtained in the low station, and it will further be noted that the two neutral stations are identical. One or both of the neutral stations could be omitted if desired.

Any suitable form of operating means may be provided for the control valve 92, that shown here being schematically illustrated as a manual control represented by the box or rectangle labeled MAN. In connection with the observation made above, relative to the presence or absence of the neutral positions in the valve 92, note should be made of the fact that when these are omitted, some form of disconnectible coupling should be provided between the engine and the shaft 14. In the present case, the master clutch is shown as representative of one form of disconnect coupling. In the present environment, the master clutch will seldom be disengaged and actually could be ignored as a part of the present invention.

As brought out in the patent noted above, the purpose of the dual inlet at 98–106 is to achieve differences in rate of clutch engagement as between alternation in the forward-forward or high-low phase and alternation in the forward-reverse phase. Stated broadly, relatively rapid engagement and disengagement is desirable in the forward-forward phase because it is desirable to avoid prolonged torque interruption. In the forward-reverse or "shuttle" phase, this characteristic takes on a different significance. However, since these details will be clear from the patent referred to, as well as being generally fundamental to those versed in the art, the description need not be elaborated.

A significant part of the present control system 90 is the clutch control valve, designated in its entirety by the numeral 110, shown schematically in FIG. 1 and in detail in FIGS. 5, 6, 7 and 8. This valve is interposed in the pump or high-pressure line 96–100 and is normally in an open position or status as indicated, completing the connection between 96 and 100. The valve 110 may be shifted to a dump position as indicated by the section thereof that includes the upwardly and leftwardly inclined arrow, which will then dump the line 100 to reservoir at 112. Considered broadly, a valve of this type without modifications to be presently described, is important from the standpoint of enabling depressurizing of the circuit, irrespective of the position of the clutch control valve 92. That is to say, in an emergency, the operator may immediately shift the valve 110 from its position at FIG. 1 to its dump position. Likewise, as will be brought out below, variation in the phase of the valve 110 as between the two basic positions just referred to will enable modulation of the clutches HC, RC and LC, which is important in "inching" the vehicle or otherwise maneuvering same in relatively close quarters or in other conditions requiring relatively precise control. The valve 110 is manually controlled, as by being connected to a typical clutch pedal 111, shown in FIG. 10 and further indicated by the box labeled "pedal" in FIG. 1. Additionally, the same pedal controls a transmission brake, represented schematically in FIG. 1 by the box labeled "brake." In other words, when the particular clutch that is engaged for normal operation becomes disengaged by depressurizing the circuit through the effects of shifting of the valve 110 to its position to the right of that shown in FIG. 1, the transmission brake will be simultaneously engaged. Conversely, when the valve 110 is returned to its FIG. 1 position, the transmission brake will be released.

The other valve represented by a two-section rectangular box at 114 in FIG. 1, and associated with a box labeled "HYD" is an accumulator control valve which has the function of cutting out the accumulator from the pump line when it is fully charged. The other box labeled "HYD" in FIG. 1 is part of the hydraulic modulation of the valve 110 and further description thereof will appear below in connection with FIGS. 5, 6, 7 and 8.

The valve 110 may include a casing 116 which may form part of or be carried in any suitable manner by the transmission housing 26. The casing is provided with a bore 118 and a counterbore 120, within which are coaxially slidable a valve spool 122 and a plunger 124, respectively. The pump or high-pressure line 96 leads to the bore 120 and the reservoir line 112 leads from the bore 118, the two passages representing the lines 96 and 112 being axially spaced along the combined bore 118–120. The line 100 that ultimately leads to the inlet 98–106 for the valve 92 leads axially off of the right hand end of the bore 120.

The FIG. 1 position of the valve 110 corresponds to that in FIG. 5, from which it will be seen that the line 96 leads to the line 100 via a radial passage 126 and an axial passage 128 in the plunger 124. A compression spring 130 acts between the plunger and spool 124 and 118 to axially separate them. The spool 122 is provided with an axial bore 132 and receives a reduced portion of the plunger 124 which is shouldered at opposite ends at 134 and 136. A plurality of balls 138 carried by appropriate radial bores in that portion of the plunger 122 having the axial bore 132 cooperates with the reduced portion of the plunger 124 and the shoulders 134 and 136 to afford a lost motion connection.

As already covered briefly, the valve 110 may be under control of a clutch pedal, as shown in FIG. 10 and as further illustrated schematically in FIG. 1. In a commercial embodiment, the interconnections among the valve 110, clutch pedal and brake may take the form of rockshafts and linkages such as those about to be described.

FIG. 9 shows a rockshaft 140, which may be suitably journaled in the housing as best shown in FIG. 2. In the present case, this rockshaft carries a clutch valve operating arm 142 connected to the clutch spool 122 by a link 144 and spring 146. The rockshaft 140 is turned in the direction of the arrow indicated in FIG. 9 to shift the valve 110 from its FIG. 5 position to its FIG. 8 position. The purpose of the spring 146 is to afford some degree of "feel" to the operator in rocking the clutch pedal.

As best shown in FIG. 2, the rockshaft 140 extends rearwardly behind the front transmission wall 28 and has keyed thereto a brake shoe 148 which is operative on the drum 36 of the high clutch HC. Since the drum 36 is connected to the range section output shaft 18, and since this shaft is the input for the speed section, the brake is applicable to the wheel-connected side of the power train and therefore is instrumental in slowing rotating parts of the transmission at the same time that the particular clutch (as among HC, RC and LC) is disengaged.

The clutch pedal 111 is or may be mounted on a transverse rockshaft 150 carried at a lower portion of the transmission housing ahead of the wall 28, and this rockshaft carries an arm 152 which is connected by a spring-loaded link 154 to an arm 156 keyed to the rockshaft 140. A torsion spring 157 acts on the rockshaft to bias same in a clockwise direction as seen in FIG. 2, thus keeping the clutch pedal in its elevated position. That is to say, depression of the pedal operates to turn the rockshaft 150 in a counterclockwise direction and the link 154 and arm 156 function to turn the fore and aft rockshaft 140 in a counterclockwise direction as seen in FIGS. 4 and 9, thus simultaneously applying the brake shoe 148 and shifting the valve 110 to its dump or disengaging position. For present purposes, as well as in the claims, the components 36 and 148 will be referred to broadly as brake means.

The operation of the valve 110 in effecting clutch modulation depends upon movement of the spool 122 and plunger 124, varied of course by the pressure in the line 100 which of course leads through the line 102, inlet 98–106 and actively positioned valve 92 (an "active" position of the valve 92 is one other than either of the neutral positions). This involves the principle that the clutch chamber pressure (one of the clutch motors HCM, LCM or RCM) is a function of the pedal position and with the feel spring 146 involved, the pedal effort will be a function of the pedal position, therefore allowing the pedal effort to be proportional to the clutch pressure. This will be best understood by regarding FIGS. 5 through 8 and noting that the link 144 and spring 146 form the interconnection between the clutch operating arm 142 and the left hand end of the spool 122 as it appears in FIGS. 5 through 8. FIG. 5 corresponds to the position of the valve 110 in FIG. 1 and therefore is the normal position with one of the clutches HC, LC or RC engaged, meaning that the respective clutch motor HCM, LCM or RCM is pressurized, the valve 92 being in one of its active positions as distinguished from its neutral positions. A land 158 on the plunger 124 blocks the bore 120 from communication with the reservoir passage 112 and consequently full pressure is transmitted to the clutch motor under concern. When the clutch pedal is fully depressed, simultaneously applying the brake means 36–148, the valve 110 assumes the position shown in FIG. 8, the spring 130 extending fully and the shoulder 134 at the left hand end of the plunger being retained by the balls 138 so that the inlet or high-pressure passage 96 is blocked by the main body portion 160 of the plunger 124. But the land 158 is now fully to the left of the reservoir line 112 and consequently the clutch motor involved may dump to reservoir via 100–128–126–112.

As the operator prepares to reengage the clutch that he just disengaged, he allows the clutch pedal to move upwardly, depending upon the circumstances in which he is involved, and consequently causes reverse rotation of the rockshafts 140 and 150 so that the valve 110 changes its position from FIG. 8 to that of FIG. 7, at which time modulation of pressure occurs as the left hand edge of the main body portion 160 of the plunger 124 just clears the left hand edge of the pressure passage 96; and the right hand edge of the land 158 on the plunger 124 approaches the annulus at the junction of the bore 118 and counterbore 120. Consequently, there is fluid flow to the clutch motor as well as to reservoir, producing a throttling effect because of the spring 130 and the pressure in the clutch motor. This provides for cushioned reengagement of the clutch and consequently permits "inching" of the vehicle. As the pedal returns almost to its fully elevated position, modulation ends, as shown in FIG. 6, wherein the plunger 122 moves farther axially inwardly of its bore 118, applying more pressure to the spring 130 which in turn applies rightward movement to the plunger 124, causing the land 158 to begin to cut off the junction between the bores 118 and 120 and therefore cutting off the communication between the pressure passage 96 and the reservoir passage 112, in which case the pressure increases in the clutch chamber so that when the pedal returns to its fully elevated position (represented by the valve 110 in FIG. 5) the land 158 fully cuts off any communication between the pressure passage 96 and the reservoir passage 112. However, in circumstances requiring control of the particular clutch HC, LC or RC, these clutches are selectively controlled by the valve 92, leaving the valve 110 in its position as shown in FIGS. 1 and 5. On the other hand, the particular clutch in engagement will be disengaged by the valve 110 when speed changes are effected in the speed section 120; although, it is possible to tie together the control valve 92 with means for shifting the speed section 20, or changes can be effected in the speed section 20 with the valve 92 in one of its neutral positions. On the other hand, these are immaterial and are mentioned only to indicate cognizance of the possibilities.

Previous reference was made to the compact arrangement of the range section shafts 14–18, 54 and 56, best illustrated in FIG. 4, which shows the triangular relationship of the three shafts (considering the shafts 14 and 18 as one, since they lie on a common axis). This arrangement means that the gears 58 and 62 will mesh substantially on a transverse line intersecting the axes of the shafts 54 and 56, consequently affording below that intersection a space which is utilized to accommodate a fore and aft power shaft 162. In other words, the shaft 162 is nesting in the space just referred to. This shaft extends forwardly through the front transmission wall 28 and has keyed or otherwise affixed thereto a gear 164 which is in constant mesh with a gear 166 keyed to or otherwise rotatable with the input shaft 14. Therefore, the power shaft 162 is constantly driven, regardless of engagement or disengagement of any of the clutches HC, RC or LC. The forward end of the shaft 162 may be extended in any appropriate manner to drive auxiliary equipment, such as the hydraulic pump P which is here shown as being embodied in a housing 168. The rear end of the shaft may be continued rearwardly to serve as a rear PTO shaft for the tractor.

It will already have been observed that the reverse countershaft 54 in FIG. 1 is shown displaced from its true position, which expedient is resorted to in the interests of exploiting the complete structure and the controls therefor in a single illustration. FIGS. 2, 3 and 4 show the actual arrangement, particularly as respects the relationship of the power shaft 162 to the components of the range section 16.

Control of the several clutches HC, RC and LC has been covered in the foregoing description, both as respects the valve 92 and the valve 110. Hence, this description need not be repeated. The same applies to the several features of the invention which are deemed to be covered above. Other advantages will be readily apparent to those versed in the art, as will many modifications and alterations in the preferred embodiment disclosed, all of which may be achieved without departure from the spirit and scope of the invention.

What is claimed is:

1. Drive mechanism, comprising: an input shaft; a relatively rotatable output shaft coaxial with the input shaft; a first clutch concentric with and slectively engageable and disengageable between said shafts; an input gear coaxially fixed to the input shaft ahead of said first clutch; first and second coaxially spaced and separate intermediate gears concentric with and journaled relative to the shafts axially behind the first clutch; a second clutch including a driven member fixed to the output shaft axially intermediate the intermediate gears and a driving member fixed to the first intermediate gear; a third clutch including said driven member and a driving member fixed to the second intermediate gear; a forward-speed countershaft journaled in parallel relation to the input and output shafts and having a front gear in constant mesh with the input gear and a rear gear in constant mesh with one of the intermediate gears; a reverse-speed counter-shaft journaled in parallel relation to the other shafts and having a front gear in constant mesh with the forward-speed countershaft front gear and a rear gear in constant mesh with the other intermediate gear; and control means for individually effecting engagement and disengagement of the first, second or third clutches and operative to engage any one clutch while the other two are disengaged so as to obtain two forward speeds and one reverse speed of the output shaft from said input shaft.

2. The invention defined in claim 1, including: a power take-off driving gear fixed to the input shaft ahead of the input gear; and a power take-off shaft journaled in parallel relation to the other shafts and having a driven gear in mesh with said power take-off driving gear.

3. The invention defined in claim 2, in which: the countershafts are offset radially from and laterally to opposite sides of the common axis of the input and output shafts so that the countershaft axes form a triangle with said common axis as the apex and a line drawn through the countershaft axes as the base, said front gears meshing generally on said line, and said power take-off shaft being nested between said front gears proximate to said line but radially outwardly of said triangle.

4. The invention defined in claim 1, in which: the control means includes first, second and third fluid motors respectively connected to and pressurizible and depressurizible for engaging and disengaging the first, second and third clutches, a fluid pressure source, and a fluid pressure circuit including said source and said motors and provided with a selector valve positionable to pressurize any one motor while depressurizing the other two to engage a selected clutch while leaving the other two disengaged, and a normally positioned dump valve in said circuit between the source and the selector valve and shiftable for depressurizing the circuit irrespective of the position of the selector valve so as to effect disengagement of all clutches.

5. The invention defined in claim 4, in which: said dump valve includes fluid pressure modulation means for effecting cushioned re-engagement of the selector-valve-selected clutch when the circuit is re-pressurized by normal positioning of the dump valve.

6. The invention defined in claim 5, including: brake means normally released from but applicable to retard the output shaft, and means interconnecting the brake means and the dump valve for applying said brake means when said dump valve is operated to depressurize the circuit.

7. The invention defined in claim 1, in which: the first clutch includes a drum fixed to the output shaft and comprising the driven part for said clutch, and a driving part fixed to the input shaft; the driven member of the second and third clutches comprises a drum rotatable with the output shaft; and brake means is provided for selective engagement with and disengagement from one of said drums.

8. Drive mechanism, comprising: an input shaft; a relatively rotatable ouput shaft coaxial with the input shaft; a first clutch concentric with and selectively engageable and disengageable between said shafts; an input gear coaxially fixed to the input shaft ahead of said first clutch; first and second coaxially spaced and separate intermediate gears concentric with and journaled relative to the shafts axially behind the first clutch; a second clutch selectively engageable and disengageable between the output shaft and the first intermediate gear; a third clutch selectively engageable between the output shaft and the second intermediate gear; a first countershaft journaled in parallel relation to the input and output shafts and having a first gear in constant mesh with the input gear and a second gear in constant mesh with one of the intermediate gears; a second countershaft journaled in parallel relation to the other shafts and having a first gear in constant mesh with the first gear on the first countershaft and a second gear in constant mesh with the other intermdeiate gear; and control means for individually effecting engagement and disengagement of the first, second or third clutches and operative to engage any one clutch while the other two are disengaged so as to obtain two different output drives in one direction and another output drive in the opposite direction.

9. The invention defined in claim 8, in which: the control means includes first, second and third fluid motors respectively connected to and pressurizible and depressurizible for engaging and disengaging the first, second and third clutches, a fluid pressure source, and a fluid pressure circuit including said source and said motors and provided with a selector valve positionable to pressurize any one motor while depressurizing the other two to engage a selected clutch while leaving the other two disengaged, and a normally positioned dump valve in said circuit between the source and the selector valve and shiftable for depressurizing the circuit irrespective of the position of the selector valve so as to effect disengagement of all clutches.

10. The invention defined in claim 9, in which: said dump valve includes fluid pressure modulation means for effecting cushioned re-engagement of the selector-valve-selected clutch when the circuit is re-pressurized by normal positioning of the dump valve.

11. The invention defined in claim 4, including: a power take-off driving gear fixed to the input shaft ahead of the input gear; and a power take-off shaft journalled in parallel relation to the other shafts and having a driven gear in mesh with said power take-off driving gear, said countershafts being offset radially from and laterally to opposite sides of the common axis of the input and output shafts so that the countershaft axes form a triangle with said common axis as the apex and a line drawn through the countershaft axes as the base, said front gears meshing generally on said line, and said power take-off shaft being nested between said front gears proximate to said line but radially outwardly of said triangle.

12. Drive mechanism, comprising: a fore-and-aft housing having a transverse wall; an input shaft extending fore and aft through said wall; a driven shaft behind said wall and coaxial with the input shaft; a clutch having a driving part rotatable with the input shaft and a driven part rotatable with the driven shaft and selectively engageable and disengageable to connect and disconnect said shafts; brake means operative on the driven part behind said wall; and fore-and-aft rockshaft extending through said wall and having fore and rear parts respectively ahead of and behind said wall; means operatively connecting said rear part to the brake means; a transverse rockshaft carried by the housing ahead of said wall; means for rocking said transverse rockshaft; and means operatively connecting said transverse rockshaft to the fore part of the fore-and-aft rockshaft.

13. Drive mechanism, comprising: a fore-and-aft housing having a transverse wall; an input shaft extending fore and aft through said wall; a driven shaft behind said wall and coaxial with the input shaft; a clutch selectively engageable and disengageable to connect and disconnect said shafts; brake means operative on the driven shaft behind said wall; a fore-and-aft rockshaft extending through said wall and having fore and rear parts respectively ahead of and behind said wall; means operatively connecting said rear part to the brake means; a transverse rockshaft carried by the housing ahead of said wall; means for rocking said transverse rockshaft; and means operatively connecting said transverse rockshaft to the fore part of the fore-and-aft rockshaft.

14. Drive mechanism, comprising: an input shaft; a coaxial driven shaft; clutch means selectively engageable and disengageable to connect and disconnect said shafts; brake means operative to retard the driven shaft; a first rockshaft parallel to the driven shaft and operatively connected to the brake means; a second rockshaft transverse to the driven shaft and operatively connected to the first rockshaft; means operatively connected between one rockshaft and the clutch means for effecting engagement and disengagement thereof respectively in accordance with release and application of the brake means; and operating means for rocking the second rockshaft.

References Cited in the file of this patent
UNITED STATES PATENTS

| | | |
|---|---|---|
| 2,316,503 | Curtis | Apr. 13, 1943 |
| 2,466,574 | Bullard et al. | Apr. 5, 1949 |
| 2,970,482 | Strehlow et al. | Feb. 7, 1961 |
| 2,998,732 | Nelson | Sept. 5, 1961 |